Feb. 16, 1971 T. J. SCULLY 3,564,392
MAGNETIC TRANSDUCER WITH MEANS FOR COMPENSATING
FOR TEMPERATURE CHANGES
Filed Sept. 19, 1969
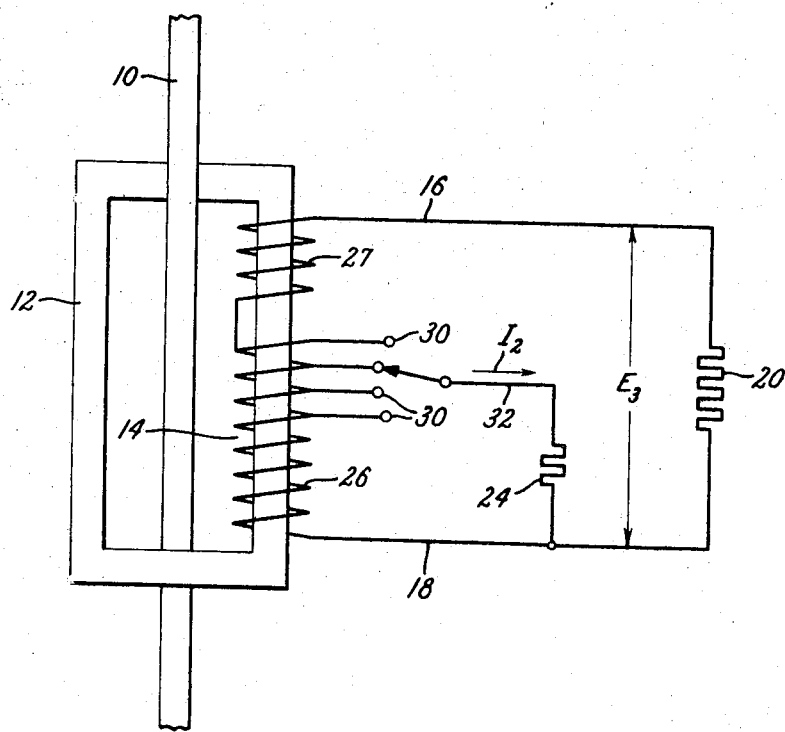
INVENTOR.
THOMAS J. SCULLY,
BY
William Freedman
ATTORNEY

United States Patent Office 3,564,392
Patented Feb. 16, 1971

3,564,392
MAGNETIC TRANSDUCER WITH MEANS FOR COMPENSATING FOR TEMPERATURE CHANGES
Thomas J. Scully, King of Prussia, Pa., assignor to General Electric Company
Filed Sept. 19, 1969, Ser. No. 859,369
Int. Cl. G05f 1/14
U.S. Cl. 323—6                      4 Claims

ABSTRACT OF THE DISCLOSURE

A magnetic transducer comprising a primary winding, a core of magnetizable material linked thereto, and a secondary winding linked to the core and having a high impedance connected thereacross across which a voltage signal proportional to primary current is developed. Across a portion only of the secondary winding, a temperature-insensitive resistor of relatively low ohmic value compared to that of the high impedance is connected. Current induced in the loop circuit comprising said secondary winding portion and the resistor connected thereacross produces a voltage drop across the secondary winding portion that counteracts the tendency of the voltage signal to increase in response to increases in the temperature of the secondary winding.

---

This invention relates to a magnetic transducer for developing a voltage signal across a secondary winding that is substantially proportional to current in a primary winding and which is capable of maintaining this substantially proportional relationship despite temperature changes.

In the magnetic transducer that I am concerned with there is a primary winding, a magnetic core linked to said primary winding, and a secondary winding linked to the core. A high impedance is connected between the output terminals of the secondary winding, and a voltage is developed across the impedance that varies directly with the current through the primary winding. A problem associated with such a transducer is that temperature variations which affect the resistance of the secondary winding tend to produce errors in the voltage signal as a measure of primary current.

An object of my invention is to provide a magnetic transducer which is relatively free from error produced by such temperature changes.

Another object is to provide a flux-controlling secondary winding portion that is related to the rest of the secondary winding structure in such a manner that a secondary current of substantial magnitude is caused to traverse the flux-controlling secondary portion and produce a voltage drop thereacross that compensates for the tendency of the voltage across the high impedance to increase with temperature increases.

Another object is to provide a magnetic transducer that is relatively insensitive to temperature change and that uses in its secondary winding a conductor of relatively small cross-section, enabling the secondary winding to be of a compact design.

Still another object is to provide a magnetic transducer in which the calibration of the transducer can be easily changed to accommodate a wide range of rated primary currents.

In carrying out the invention in one form, I provide a primary winding, a core of magnetizable material linked thereto, and a secondary winding linked to the core and having a pair of output terminals across which a high impedance is connected and across which a voltage signal indicative of primary current is developed. Across a portion only of the secondary winding, I connect a resistor of relatively low ohmic value compared to that of the impedance, thus forming a loop comprising said resistor and said portion of the secondary winding connected in series. The resistor has a low temperature coefficient of resistance so that its resistance remains substantially constant despite temperature changes. Current through the primary winding induces a compensating current in said loop, and this compensating current in flowing through said secondary winding portion produces a voltage drop thereacross that acts to substantially cancel changes in the voltage signal that would otherwise result from changes in the temperature of the secondary winding.

For a better understanding of the invention, reference may be had to the following description taken in conjunction with the accompanying drawing wherein:

The single figure is a schematic showing of a magnetic transducer embodying one form of my invention.

Referring now to the drawing, there is shown a primary conductor 10 through which relatively high alternating currents pass. This primary conductor is typically one phase of a polyphase A-C power distribution system which might have a continuous current rating of a predetermined value in a range of between 45 amperes and 4000 amperes.

Linked to the primary winding 10 is a core 12 of magnetizable material such as laminated transformer-type iron. The core 12 is shown surrounding the primary winding 10. Also linked to the core 12 is a secondary winding 14 having output terminals 16 and 18 at its opposite ends. Across these output terminals an impedance 20 of a very high value is connected. Between terminals 16 and 18, a voltage $E_3$ is developed which varies directly with the current through primary winding 10. In one embodiment of the invention, this voltage $E_3$ is used for energizing a time-overcurrent relay (not shown) that operates in response to an overcurrent through primary conductor 10 after a time interval that varies inversely with respect to the square of the current. The core together with its primary and secondary windings is referred to hereinafter as a magnetic transducer.

A problem associated with a magnetic transducer such as described up to this point is that temperature changes that affect the resistance of the secondary winding tend to produce errors in the output voltage $E_3$ that impair its accuracy as a measure of primary current.

For reducing such errors, I connect across a portion only of the secondary winding 14 a resistor 24 which has a low ohmic value compared to that of impedance 20. This resistor 24 has a low temperature coefficient of resistance which enables its resistance to remain substantially constant despite temperature changes. The resistor 24 and the portion 26 of the winding 14 that it is connected across constitute a loop circuit in which a current $I_2$ in induced by changes in the flux in the core 12 generated by current $I_1$ through the primary conductor 10. The portion of secondary winding 14 that is outside the loop circuit is designated 27. Current $I_2$ does not flow through this winding portion 27.

The secondary current $I_2$ in passing through winding portion 26 produces a voltage drop across the winding portion 26 that is approximately equal to $I_2 N_2 r$, where $N_2$ is the number of turns in secondary winding portion 26 and $r$ is the resistance per turn of winding portion 26. This voltage drop tends to reduce the voltage that would otherwise be developed between the terminals 16 and 18 of the entire secondary winding 14. If the temperature of winding portion 26 should increase, due, for example, to an increased ambient temperature or to increased current through winding portion 26, then $r$ would also increase, thereby increasing the voltage drop $I_2 N_2 r$ across the winding portion 26, thus reducing and substantially cancelling out any tendency of $E_3$ to increase in response to the increased temperature.

The voltage $E_3$ can be shown to substantially equal $$\frac{N_3}{N_2}E_2 - I_2 N_2 r$$

where $N_3$ is the number of turns in the entire secondary winding 14, and $E_2$ is the voltage drop around the loop circuit 26, 24. This voltage drop $E_2$ is substantially equal to $I_2 R + I_2 N_2 r$, where R is the resistance of resistor 24. $I_2$ is substantially equal to $N_1 I_1 / N_2$, where $N_1$ is the number of turns in the primary winding, in this particular case 1, and $I_1$ is the primary current.

Returning now to the above equation, $$E_3 = \frac{N_3}{N_2}E_2 - I_2 N_2 r$$

and substituting into it the various terms derived above for $E_2$ and $I_2$, the following quadratic equation can be derived:

$$N_2^2 - \left[\frac{N_1 N_3 I_1 r}{E_3 + N_1 I_1 r}\right] N_2 - \frac{N_1 N_3 I_1 R}{E_3 + N_1 I_1 r} = 0$$

If the variables $E_3$ and $r$ in the immediately above quadratic equation are differentiated with respect to temperature T, and $N_1$ is assumed to be 1, the following equation can be derived:

$$\frac{dE_3}{dT} = I_1 \left[\frac{N_3 - N_2}{N_2}\right]\frac{dr}{dT}$$

From this equation it can be seen that for a given change in $r$ in response to a temperature change, the change in $E_3$ will be proportional to $N_3 - N_2/N_2$, assuming $I_1$ remains fixed. By keeping the number of turns $N_2$ relatively close to $N_3$, $E_3$ can be kept substantially constant despite the temperature change. Typically, the change in $E_3$ can be held well under 5% despite a 50° C. temperature change.

If instead of being constructed as shown, the secondary of the transducer had been constituted by two entirely separate windings, one corresponding to winding 26 and the other constituted by a signal-voltage-developing winding having $N_3$ turns and having the high impedance 20 connected thereacross, then the above-described compensating effect would not be present. The increase in voltage drop across winding 26 which accompanies increased temperature would not compensate for the tendency of the signal voltage across the other winding to increase with the increasing temperature. With such an arrangement, it can be shown that the change in $E_3$ across the signal-voltage-developing winding would be proportional to $N_3/N_2$ instead of $N_3 - N_2/N_2$, as in the illustrated arrangement. This would, of course, be a much larger change in $E_3$ for a given temperature change than is present in my arrangement.

The illustrated secondary 14 is provided with a plurality of taps 30 to individual ones of which conductor 32 can be connected to change the number of turns $N_2$ that are bridged by the resistor 24 and are therefore in series with resistor 24 in the loop circuit. By changing taps to change the number of turns $N_2$, substantially the same value of voltage $E_3$ can be developed for any selected value of continuous primary current within a wide range, e.g., a range of 600 amperes to 1600 amperes. Thus, if the continuous current rating of the power system should be increased so that it is desired to respond to a higher value of continuous primary current, then a suitable tap change can be made to suitably increase $N_2$ and provide the same value of output voltage $E_3$ when the higher continuous current is present. The extent of the change required in $N_2$ to provide a given output voltage $E_3$ for a given primary current can easily be determined from the quadratic equation referred to above. Thus, it will be seen that it is a simple matter to recalibrate our magnetic transducer to accommodate changes in the rated continuous primary current.

It would be possible to render a transducer of the general type shown insensitive to temperature changes by keeping the resistance per turn $r$ very low, thus minimizing the heating effect of the secondary current. But this approach is not practical because it would require a secondary conductor of very large cross section which would be expensive and would consume an undue amount of space. With the above-described compensating effect present, I can tolerate changes in the temperature of the secondary winding and I am therefore able to use a secondary conductor of a relatively small cross-section that is economical and does not consume an undue amount of space. Thus, I can make my transducer a very compact assembly.

Another factor contributing to compactness is that the flux-controlling portion 26 of my secondary winding serves not only to control the compensating current $I_2$, but also as part of the overall secondary winding 14 in the sense of contributing its turns N2 to form a part of the total number of secondary turns N3. If separate secondary windings were provided, as mentioned above, the separate winding portion 27 would have to include as many turns as 26 and 27 together include in my arrangement in order to produce the desired voltage signal $E_3$.

It is highly desirable that the resistor 24 be capable of retaining its resistance substantially unchanged despite temperature changes because any increase in its resistance R would be reflected in increased voltage $E_3$ being developed across the output terminals 16, 18, as will be apparent from the quadratic equation set forth above.

It is to be understood that the current $I_3$ flowing between output terminals 16 and 18 via the high impedance 20 is practically zero. In a typical transducer this current is only around 15 milliamperes. Thus, its heating effect is substantially negligible.

In the illustrated arrangement the winding portion 27 is made of a light gage wire in comparison to that of the winding portion 26. This is possible because only the very low current that flows through high impedance 20 flows through winding portion 27, thus causing little heating of winding portion 27 despite its lightness.

The output voltage $E_3$ of my above-described transducer is substantially proportional to the primary current $I_1$, and by virtue of the above-described temperature-compensating arrangement, this substantially proportional relationship is maintained despite temperature changes.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. A magnetic transducer comprising a primary winding and a secondary winding for developing a voltage signal across said secondary winding that is substantially proportional to current in the primary winding despite temperature changes that affect the resistance of said secondary winding, comprising:
   (a) a core of magnetizable material linked to said primary winding,
   (b) said secondary winding being linked to said core and having a pair of terminals across which said voltage signal is developed,
   (c) a high impedance connected across said terminals,
   (d) a loop circuit comprising a portion only of said secondary winding and a resistor connected across said secondary winding portion for receiving compensating current induced in said loop circuit by current in said primary winding,
   (e) said resistor having an ohmic value much lower than said impedance and having a low temperature coefficient of resistance that causes the resistance of the resistor to remain approximately constant despite said temperature changes, (f) said compensating current in passing through said secondary winding portion developing a voltage drop across said secondary winding portion which varies directly with the temperature of said secondary winding portion and counteracts the tendency of the voltage between said terminals to increase as the temperature of said secondary winding increases.

2. The magnetic transducer of claim 1 in which said secondary winding is provided with taps on different ones of its turns which can be selectively connected into series-circuit relationship with said resistor to change the number of turns in said secondary winding portion which are in said loop circuit.

3. The magnetic transducer of claim 1 in combination with means for changing the number of turns in said secondary winding portion so as to recalibrate the transducer for different rated values of primary current.

4. The magnetic transducer of claim 1 in which a substantial portion of said secondary winding outside said loop circuit is of a much lighter gage conductor than the secondary winding portion in said loop circuit.

References Cited

UNITED STATES PATENTS 3,436,600   4/1969   Salo _____ 323—6X

FOREIGN PATENTS 1,057,236   1959   Germany _____ 336—179

JAMES D. TRAMMELL, Primary Examiner

G. GOLDBERG, Assistant Examiner

U.S. Cl. X.R.

317—16; 323—8, 61, 69, 81; 336—55, 179